United States Patent [19]

Stull et al.

[11] Patent Number: 4,563,973

[45] Date of Patent: Jan. 14, 1986

[54] HEAT DETECTION APPARATUS

[76] Inventors: Dean P. Stull, 6225 Niwot Rd., Longmont, Colo. 80501; Raymond E. Bennett, 4166 Culebra Ct., Boulder, Colo. 80302

[21] Appl. No.: 630,030

[22] Filed: Jul. 12, 1984

[51] Int. Cl.$^4$ .......................... G01K 1/02; G01K 1/14
[52] U.S. Cl. ..................................... 116/218; 374/160
[58] Field of Search ....................... 374/160, 206, 187; 116/217, 218

[56] References Cited

U.S. PATENT DOCUMENTS

| | | | |
|---|---|---|---|
| 1,443,786 | 1/1923 | Dolph | 116/218 |
| 2,964,947 | 12/1960 | DeJong | 374/206 |
| 3,244,137 | 4/1966 | Garvey | 116/217 |
| 3,382,840 | 5/1968 | Pabst | 116/218 |
| 3,656,452 | 4/1972 | Kliener | 116/218 |
| 3,971,333 | 7/1976 | Levy | 116/218 X |
| 4,104,916 | 8/1978 | Hofer | 374/206 |

*Primary Examiner*—Daniel M. Yasich
*Attorney, Agent, or Firm*—Benasutti & Murray

[57] ABSTRACT

A heat detection apparatus comprising a display face having a protruding member extending therefrom disposed in a fixed frame means and connected to a tension means in a tensioned mode, said protruding member and display face maintained in a first position under tension by a solid retention means disposed with the distal end of said protruding member in communication with said protruding member and frame means with said retention means meltable at an elevated temperature, and wherein melting of said retention means permits relaxation of said tension means resulting in said protruding member and display face moving in a second position under relaxation, and further wherein said display face displays a first indicator of non-elevated temperature in the first position and a second indicator of elevated temperature in the second position. Also disclosed is the heat detection apparatus above described in combination with a barrier, as well as a method of determining at a first side of a barrier the presence of an elevated temperature at a second side of said barrier through utilization of said heat detection apparatus.

3 Claims, 5 Drawing Figures

HEAT DETECTION APPARATUS

BACKGROUND OF THE INVENTION

This invention relates to a mechanical heat detection apparatus mountable to provide a visually-perceivable warning on one side of a barrier when the temperature on the other side of said barrier is elevated.

The importance of safety from fire and its accompanying fumes is highly recognized as a life saver for occupants of any structure. While such importance is valuable in all structures, its value is especially critical in multi-story buildings where occupants do not have ready access to the ground through windows or other openings. High density buildings such as hotels and apartments are particularly vulnerable.

An important aspect of the success of such safety is the provision of information to an occupant concerning temperature conditions along a potential escape route. Heretofore, such information generally has been provided via audible sirens, buzzers, and the like which warn of actual fire, smoke presence, or elevated temperature. In a building such as a hotel, however, this information is unfortunately somewhat too general in that it warns of the presence of a danger, but generally does not specifically identify the location of this danger for the occupant. Thus, while an occupant may know that a fire exists, he does not know whether the hallway outside his door is involved unless he opens the door and looks. Such an action can be fatal if the hallway is involved in the fire, since the fire and its heat, fumes and smoke enter the room.

It therefore is important for escape purposes for an occupant of a burning building to know without undue risk the temperature condition directly outside of the room which he occupies. The invention disclosed herein provides such knowledge in a visually-perceivable manner, thereby providing such occupant with direct temperature information without direct exposure.

SUMMARY OF THE INVENTION

The subject of the instant invention is a heat detection apparatus comprising a display face having a protruding member extending therefrom disposed in a fixed frame means and connected to a tension means in a tensioned mode, said protruding member and display face maintained in a first position under tension by a solid retention means disposed with the distal end of said protruding member in communication with said protruding member and frame means with said retention means meltable at an elevated temperature, and wherein melting of said retention means permits relaxation of said tension means resulting in said protruding member and display face moving to a second position under relaxation, and further wherein said display face displays a first indicator of non-elevated temperature in the first position and a second indicator of elevated temperature in the second position.

The term "elevated temperature" as used throughout this document is defined as a temperature which would be hazardous to a living being.

Also disclosed is the heat detection apparatus above-described in combination with a barrier and mounted thereto, with at least a portion of the fixed frame means disposed within the walls of a hole through said barrier.

Additionally disclosed is a method of determining at a first side of a barrier the presence of an elevated temperature at a second side of said barrier. The method comprises providing to the barrier a heat detection apparatus as above-described whose protruding member's length is no less than the thickness of said barrier. The barrier is provided with a hole there through extending from the first side thereof to the second side thereof, said hole having a cross-section dimension whose magnitude permits maintenance of the external wall of the frame means in juxtaposition with the internal wall of the hole. In the method at least a portion of the frame means is secured within the hole in the barrier, with the distal end of the protruding member disposed at the second side of said barrier and the display face disposed at the first side of said barrier. The method is completed by observing the indicator displayed on the display face.

DETAILED DESCRIPTION OF A PREFERRED EMBODIMENT

Figure 1:
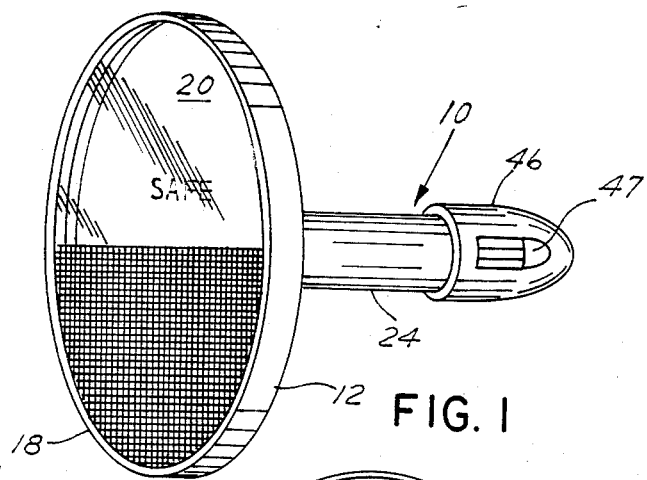
FIG. 1 is a perspective view of a heat detection apparatus in an assembled state.
Figure 2:
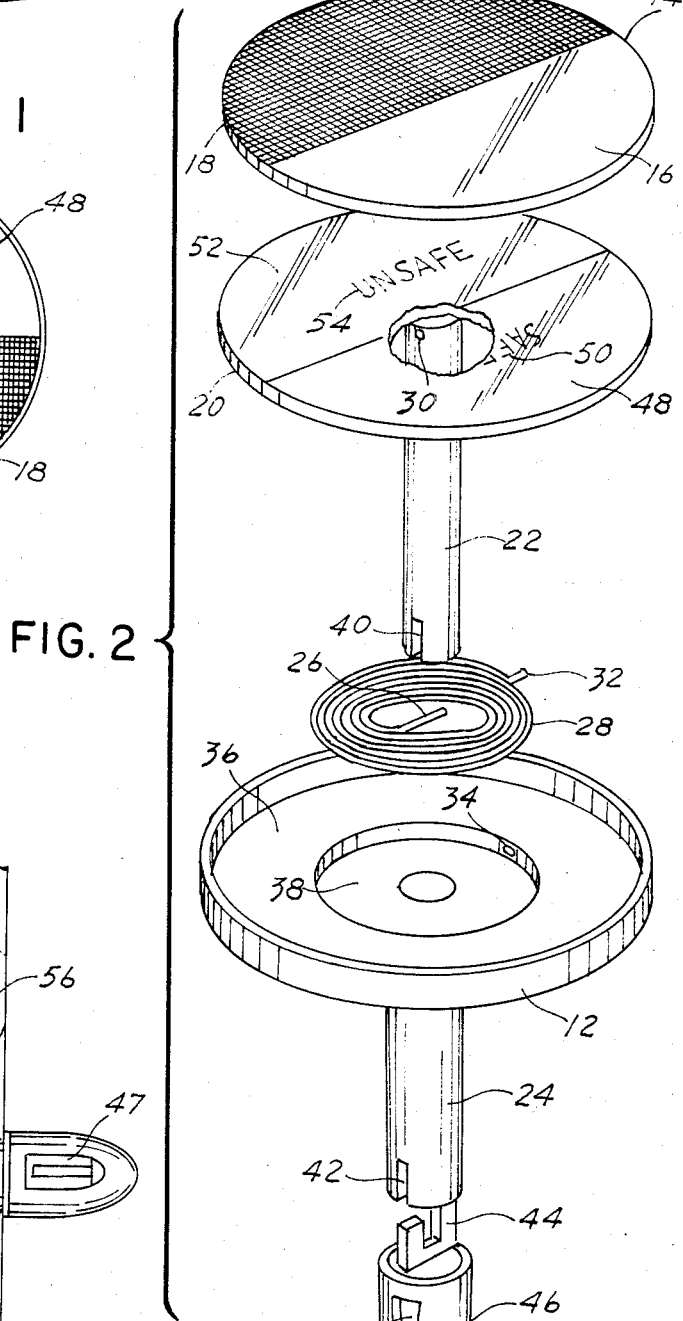
FIG. 2 is a perspective view of the heat detection apparatus of FIG. 1 in a sequentially dis-assembled state.

Referring to FIGS. 1 and 2, a heat detection apparatus 10 is shown. The apparatus 10 comprises a fixed frame means here being a housing 12 having at its front a lens 14 which has a transparent half 16 and an opaque half 18. Within the housing 12 resides a display face here being a disc 20 having a protruding member here being a stem 22 extending perpendicularly from the center thereof for the length of and within a complimentary hollow stem 24 of the housing 12.

A first end 26 of a tension means here being a spring 28 resides by friction fit within a hole 30 near the top of the stem 22, as shown in the cut-away in FIG. 2. The second end of the spring 28 resides by friction fit in a hole 34 in the wall of a recessed portion 38. The remainder of the spring 28 resides in said recessed portion 38 of the floor 36 of the housing 12. Said spring 28, of course, provides a tension means to the disc 20 and stem 22.

At the distal end of the stem 22 a groove 40 is provided. Likewise, at the distal end of the stem 24 a groove 42 complimentarily alignable with the groove 40 is provided. Solid retention means here being a clip 44 in communication with the stems 22, 24 holds the grooves 40, 42 in alignment by friction fit. Finally, in the embodiment shown, a cap 46 is included, and resides by friction fit around the base of the stem 24. The cap 46 has a side opening 47 which exposes the clip 44.

The disc 20 has on a first half 48 thereof a first indicator 50 showing safe temperature conditions, and has on the second half 52 thereof a second indicator 54 showing unsafe temperature conditions. While the indicators 50, 54 here shown are words, it is to be understood that such indicators also can be chosen from symbols, colors, and the like alone or in combination with each other.

For operation of the heat detection apparatus 10, alignment of the grooves 40, 42 is correlated with the first half 48 of the disc 20 so that said first half 48 is visible through the transparent half 16 of the lens 14, and is also correlated with tension in the spring 28 so that when said tension is relaxed the disc 20 rotates one-half revolution. The clip 44 is then placed into the grooves 40, 42 to maintain the positions above-described, and the cap 46 is placed. Of course, the second half 52 of the disc 20 is hidden from view behind the opaque half 18 of the lens 14.

Figure 3:
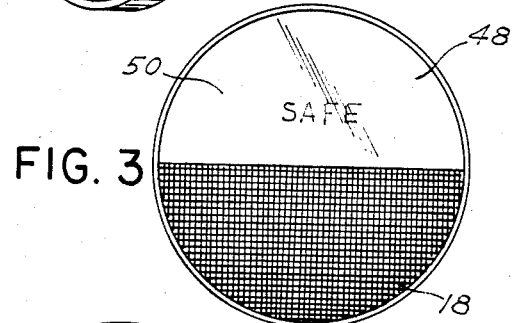
FIG. 3 is a front elevational view of the display face of the heat detection apparatus of FIG. 1 showing a non-elevated temperature condition.
Figure 4:
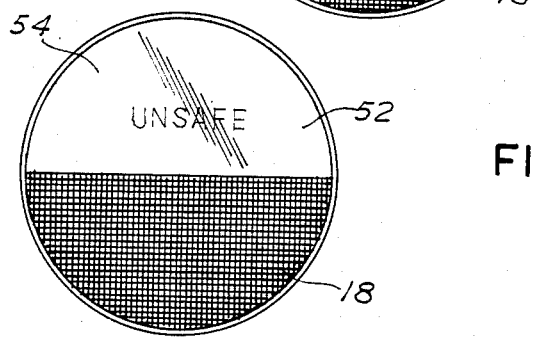
FIG. 4 is a front elevational view of the display face of the heat detection apparatus of FIG. 1 showing an elevated temperature condition.

Operationally, when a non-elevated temperature is experienced, the clip 44 remains in place and the heat detection apparatus 10 displays a safe condition as shown in FIG. 3. Conversely, when an elevated temperature is experienced by the clip 44, said clip melts, thereby permitting relaxation of the spring 28 and resultant rotation of the disc 20 to display the second half 52 thereof, indicating unsafe temperature conditions as shown in FIG. 4, through the transparent half 16 of the lens 14.

Figure 5:
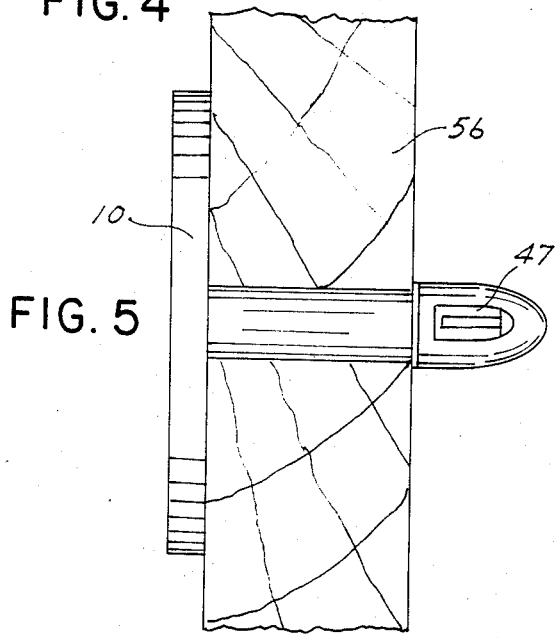
FIG. 5 is a side elevational view of the heat detection apparatus of FIG. 1 mounted in a barrier shown in section.

As illustrated in FIG. 5, maximum utility of the heat detection apparatus 10 is realized when the stems 22, 24 are disposed through a barrier 56 such as a door, with the clip 44 residing on one side of said barrier 56 and the disc 20 residing on the other side. In such manner an occupant of a room having a door so equipped can easily learn by simple observation of the position of the disc 20 the temperature condition outside the door without opening the door. If an elevated temperature exists outside the room, the clip 44 will melt as above-described, and such a warning will appear inside the room on the disc 20 through the transparent half 16 of the lens 14. If the temperature condition is shown to be unsafe, the occupant would know to not open the door.

As would be evident to the skilled artisan, mounting the apparatus 10 through a barrier 56 such as a door requires drilling through the barrier a hole slightly larger in diameter than the diameter of the stem 24 for a friction fit thereof in said hole. Such friction fit maintains the external wall of the frame means in juxtaposition with the internal wall of the hole. Lengths of the stems 22, 24 should be, of course, of a sufficient magnitude to permit the ends thereof and accompanying clip 44 to be disposed on the other side of said barrier 56 after they are passed through the hole. As would be evident to the skilled artisan, it is important that the meltable retention means be exposed to the ambient conditions outside the barrier.

A preferred material for construction of the clip 44 is a fusable alloy commonly referred to as "Wood's Metal." This composition is comprised of 49.4% bismuth, 27.7% lead, 12.9% tin, and 10.0% cadmium. As would be apparent to the skilled artisan, various combinations of the elements above-listed can be employed to make alloys with other respective melting points as desired. Likewise, of course, other materials having melting points as desired can be employed. The remainder of the apparatus 10 is constructed of thermally-stable materials, with the term "thermally-stable" defined as a condition wherein the particular material will withstand a temperature above the melting point of the clip 44, and preferably a temperature of at least 250° F. Thus, the materials can be chosen from metals, plastics such as acrylonitrile-butadiene-styrene (ABS) or polycarbonates, or the like as appropriate for function and as would be recognized by a person with ordinary skill in the art as meeting the "thermally-stable" requirement. As would be apparent, the various components of the apparatus 10 can be made according to known methods of manufacture and can be assembled by hand.

It is to be understood that the above description of the preferred embodiment is illustrative and not limiting, and that the scope of the invention is defined in the claims which now follow.

What is claimed is:

1. A heat detection apparatus comprising a disc having a protruding stem extending perpendicularly from the center thereof, said stem and disc disposed in a housing in a fixed frame means and connected to a tension means in a tensioned mode in said housing, with the disc residing in a portion of said housing with said housing also having a hollow stem essentially the length of and in which resides said protruding stem and wherein the ends of the hollow stem and the protruding stem have grooves therein registered with each other, said protruding stem and disc maintained in a first position under tension by a clip disposed in said grooves and meltable at an elevated temperature, and wherein melting of said clip permits relaxation of said tension means resulting in said protruding stem and disc moving to a second position under relaxation, and further wherein said disc displays a first indicator of non-elevated temperature in the first position and a second indicator of elevated temperature in the second position.

2. In combination with a barrier, a heat detection apparatus comprising a disc having a protruding stem extending perpendicularly from the center thereof and disposed with a first end in a stem means in a fixed frame means and a second end thereof connected to a tension means in a tensioned mode, with at least a portion of the fixed frame means disposed in communication with the walls of and throughout the length of a hole through said barrier, said frame means comprising a housing having a portion in which the disc resides, with said housing also having a hollow stem essentially the length of and in which resides said protruding stem and wherein the ends of the hollow stem and the protruding stem have grooves therein registered with each other, said protruding stem and disc maintained in a first position under tension by a clip disposed in said grooves and meltable at an elevated temperature, and wherein melting of said clip permits relaxation of said tension means resulting in said protruding stem and disc moving to a second position under relaxation, and further wherein said disc displays a first indicator of non-elevated temperature in the first position and a second indicator of elevated temperature in the second position.

3. A method of determining at a first side of a barrier the presence of an elevated temperature at a second side of said barrier, the method comprising:

(a) providing to the barrier a heat detection apparatus comprising a disc having a protruding stem extending perpendicularly from the center thereof and whose length is no less than the thickness of said barrier, said protruding stem disposed in a fixed frame means and connected to a tension means in a tensioned mode, said frame means comprising a housing having a portion in which the disc resides, with said housing also having a hollow stem essentially the length of and in which resides a first end of said protruding stem and wherein the ends of the hollow stem and the protruding stem have grooves therein registered with each other, said protruding stem and disc maintained in a first position under tension by a clip disposed in said grooves and meltable at an elevated temperature, and wherein melting of said clip permits relaxation of said tension means resulting in said protruding stem and disc moving to a second position under relaxation, and further wherein said disc displays a first indicator of non-elevated temperature in the first position and a second indicator of elevated temperature in the second position;

(b) providing to the barrier a hole there-through extending from the first side thereof to the second side thereof, said hole having a cross section dimension whose magnitude permits maintenance of the external wall of the frame means in juxtaposition with the internal wall of the hole;

(c) securing at least a portion of the frame means within the hole in the barrier, with the distal end of the protruding stem disposed at the second side of said barrier and the disc disposed at the first side of said barrier; and (d) observing the indicator displayed by the disc.

* * * * *